United States Patent
Raissinia et al.

(10) Patent No.: US 7,065,378 B1
(45) Date of Patent: *Jun. 20, 2006

(54) OPTIMAL USE OF REQUEST ACCESS TDMA SLOTS FOR AUTOMATIC LEVEL CONTROL

(75) Inventors: Ali Raissinia, Monte Sereno, CA (US); Gregory G. Raleigh, Woodside, CA (US); Vincent K. Jones, IV, Redwood Shores, CA (US); Michael Pollack, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/852,861

(22) Filed: May 24, 2004

Related U.S. Application Data (63) Continuation of application No. 09/348,645, filed on Jul. 6, 1999, now Pat. No. 6,788,950.

(51) Int. Cl.
*H04B 7/00* (2006.01)
*H04Q 7/20* (2006.01)

(52) U.S. Cl. .................. 455/522; 455/69; 455/70; 370/203; 370/311; 370/318; 370/321

(58) Field of Classification Search ............ 455/69–70, 455/522, 434; 370/203–210, 318–319, 280–282, 370/311, 343, 334–335, 252, 314, 336–337, 370/342, 344, 436, 437, 322, 465, 329, 348
See application file for complete search history.

(56) References Cited

U.S. PATENT DOCUMENTS

| | | | |
|---|---|---|---|
| 5,056,109 A | | 10/1991 | Gilhousen et al. |
| 5,465,398 A | * | 11/1995 | Flammer ................. 455/69 |
| 5,689,502 A | * | 11/1997 | Scott ...................... 370/281 |
| 5,726,978 A | | 3/1998 | Fridigh et al. |
| 5,732,113 A | * | 3/1998 | Schmidl et al. .......... 375/355 |
| 5,933,421 A | * | 8/1999 | Alamouti et al. ......... 370/330 |
| 5,995,496 A | | 11/1999 | Honkasalo et al. |

(Continued)

OTHER PUBLICATIONS

"Data-over-cable services interface specifications", 1997, Radio Frequency Interface Specification, Cable Television Laboratories.

(Continued)

*Primary Examiner*—Lee Nguyen
*Assistant Examiner*—Tuan Tran
(74) *Attorney, Agent, or Firm*—Cindy Kaplan (57) ABSTRACT

Systems and methods for controlling subscriber unit power level using power measurements made on access request transmissions. Since a subscriber unit access request typically precedes a subscriber unit data transmission by a relatively short period of time, the data transmission power level will then be based on a recent power measurement. The access request may also trigger a sequence of power control steps including the transmission of special upstream power measurement transmissions which can be used as the basis for even more accurate power control. These power control features are particularly useful in fading environments such as found in a wireless system.

21 Claims, 7 Drawing Sheets

U.S. PATENT DOCUMENTS

| | | |
|---|---|---|
| 6,141,393 A | 10/2000 | Thomas et al. |
| 6,158,041 A | 12/2000 | Raleigh et al. |
| 6,160,821 A * | 12/2000 | Dolle et al. ................. 370/509 |
| 6,192,026 B1 * | 2/2001 | Pollack et al. .............. 370/203 |
| 6,333,937 B1 * | 12/2001 | Ryan ........................ 370/468 |
| 6,463,096 B1 * | 10/2002 | Raleigh et al. ............. 375/225 |
| 6,498,785 B1 * | 12/2002 | Derryberry et al. ......... 370/311 |
| 6,657,949 B1 * | 12/2003 | Jones et al. ................. 370/205 |
| 6,788,950 B1 * | 9/2004 | Raissinia et al. ........... 455/522 |

OTHER PUBLICATIONS

Pollack et al., "Medium access control protocol for OFDM wireless networks", 1998, U.S. Appl. No. 09/019,938.

\* cited by examiner

OPTIMAL USE OF REQUEST ACCESS TDMA SLOTS FOR AUTOMATIC LEVEL CONTROL

STATEMENT OF RELATED APPLICATIONS

The present application is a continuation of U.S. patent application Ser. No. 09/348,645, filed Jul. 6, 1999, now U.S. Pat. No. 6,788,950 and is related to the subject matter of the following co-filed, co-assigned applications:

U.S. patent application Ser. No. 09/348,646, filed Jul. 6, 1999, entitled WIRELESS POWER CONTROL IN CONJUNCTION WITH A WIRELINE MAC PROTOCOL;

U.S. patent application Ser. No. 09/348,647, filed Jul. 6, 1999, entitled COMMUNICATION OF PHYSICAL LAYER CONTROL PARAMETERS U.S. patent application Ser. No. 09/348,644, filed Jul. 6, 1999, entitled REALTIME POWER CONTROL IN OFDM SYSTEMS;

U.S. patent application Ser. No. 09/348,719, filed Jul. 6, 1999, entitled POWER REGULATION USING MULTI-LOOP CONTROL;

U.S. patent application Ser. No. 09/348,727, filed Jul. 6, 1999, entitled POLLING FOR TRANSMISSION POWER CONTROL;

U.S. patent application Ser. No. 09/348,718, filed Jul. 6, 1999, entitled EFFICIENT REQUEST ACCESS FOR OFDM SYSTEMS.

The present application is also related to the subject matter of U.S. application Ser. No. 09/019,938, filed Feb. 6, 1998, titled MEDIUM ACCESS CONTROL PROTOCOL FOR OFDM WIRELESS NETWORKS.

All of the related applications are incorporated by reference herein for all purposes.

BACKGROUND OF THE INVENTION

The present invention is related to digital communication systems and more particularly to systems and methods for controlling output power of subscriber units in a point to multipoint communication system.

A point to multipoint wireless communication system represents a potentially effective solution to the problem of providing broadband network connectivity to a large number of geographically distributed points. Unlike optical fiber, DSL, and cable modems, there is no need to either construct a new wired infrastructure or substantially modify a wired infrastructure that has been constructed for a different purpose.

In order to conserve scarce spectrum, the data communication devices of a point to multipoint wireless communication system may share access to a common frequency. In a typical scenario one or more frequency channels are allocated to downstream broadcast communication from a central access point to a plurality of subscriber units and one or more separate frequency channels are allocated to upstream communication from the subscriber units to the central access point. For upstream communication there is a medium access control (MAC) protocol that determines which subscriber unit is permitted to transmit at which time so as not to interfere with transmissions from other subscriber units.

For a given upstream frequency, the time domain is divided into frames which are typically of equal duration. Each frame represents an individually allocable unit in the time domain. One subscriber unit transmits in each frame. Reservations for transmission in a particular frame are made by the central access point and distributed in broadcast downstream transmissions. Such a scheme is referred to as a time domain multiple access scheme (TDMA).

In such a point to multipoint wireless communication system, it is generally preferable to centrally control the transmission power of each subscriber unit. Each subscriber unit should transmit at a power sufficient to ensure accurate reception its transmission yet not so high so as to overload the front end of the central access points receiver or cause interference to unintended receivers. Power control involves monitoring received power for each subscriber unit at the central access point and sending power adjustment information downstream to maintain power at the desired level.

Cable modem systems also involve access to a shared medium and also require subscriber unit power control. It would be desirable to simply adopt a MAC protocol already developed for cable applications to the wireless context. One such protocol that has been developed is referred to as MCNS protocol. The MCNS protocol is described in the Data-over-Cable Service Interface Specifications, Radio Frequency Interface Specification, SP-RFI-I04-980724, (Cable Television Laboratories, 1997), the contents of which are herein incorporated by reference.

A cable MAC layer like MCNS is already implemented in low cost chip sets. The operational characteristics of MCNS are well known. Furthermore, it is desirable to maintain parts commonality between wireless modems and cable modems to the extent possible.

The MCNS protocol provides for controlling the power of subscriber units. In one implementation, the power control function is combined with monitoring of the round trip propagation delay between the central access point and individual subscriber units. Periodically, the central access point sends a ranging request message to a particular subscriber unit. In response to the ranging request message, the subscriber unit sends a ranging response to the central access point. Based on this transmission, the central access point establishes a round trip propagation delay and sends this value to the subscriber unit. The central access point measures the power level of the ranging response message. Based on the power measurement, the central access point sends the subscriber unit power adjustment information to help the subscriber unit set its power so that it will be received at a desired level.

This combined ranging and power control operation is, however, relatively infrequent, occurring approximately every two seconds in a typical implementation. This MAC layer power control operation cannot easily be made more frequent because of the limited processing power provided by equipment implementing the MCNS protocol. Also, each subscriber unit's ranging response requires a MAC frame, causing frequent updates to reduce system efficiency.

In a wireless system, the frequency of power control feasible with the use of MCNS power control features is insufficient due to the inherently more rapid variation in wireless channel response over time. What is needed are systems and methods for providing more rapid update of subscriber unit power level while still interoperating with wireline MAC protocols.

SUMMARY OF THE INVENTION

Systems and methods for controlling subscriber unit power level using power measurements made on access request transmissions are provided by virtue of the present invention. Since a subscriber unit access request typically precedes a subscriber unit data transmission by a relatively short period of time, the data transmission power level will then be based on a recent power measurement. The access request may also trigger a sequence of power control steps including the transmission of special upstream power measurement transmissions which can be used as the basis for even more accurate power control. The power control features of the present invention are particularly useful in fading environments such as found in a wireless system.

In accordance with a first aspect of the present invention, a method for operating a central access point in a point to multipoint communication system is provided. The method includes receiving an access request transmission from a subscriber unit and performing a power control sequence to control output power of the subscriber unit in response to the access request transmission.

In accordance with a second aspect of the present invention, a method for operating a subscriber unit in a point to multipoint communication system is provided. The method includes sending an access request transmission to a central access point, and receiving a first power adjustment information indicator from the central access point. The first power adjustment information indicator has been generated as part of a procedure performed responsive to the access request transmission. The method further includes receiving a scheduling transmission from the central access point. The scheduling transmission has been generated in response to the access request transmission and specifies a time of a future transmission by the subscriber unit. The method further includes sending the future transmission to the central access point at a power level determined in response to the power adjustment command.

Further understanding the nature and advantages of the invention herein may be realized by reference to the remaining portions of the specification and the attached drawings.

DESCRIPTION OF SPECIFIC EMBODIMENTS

Figure 1:
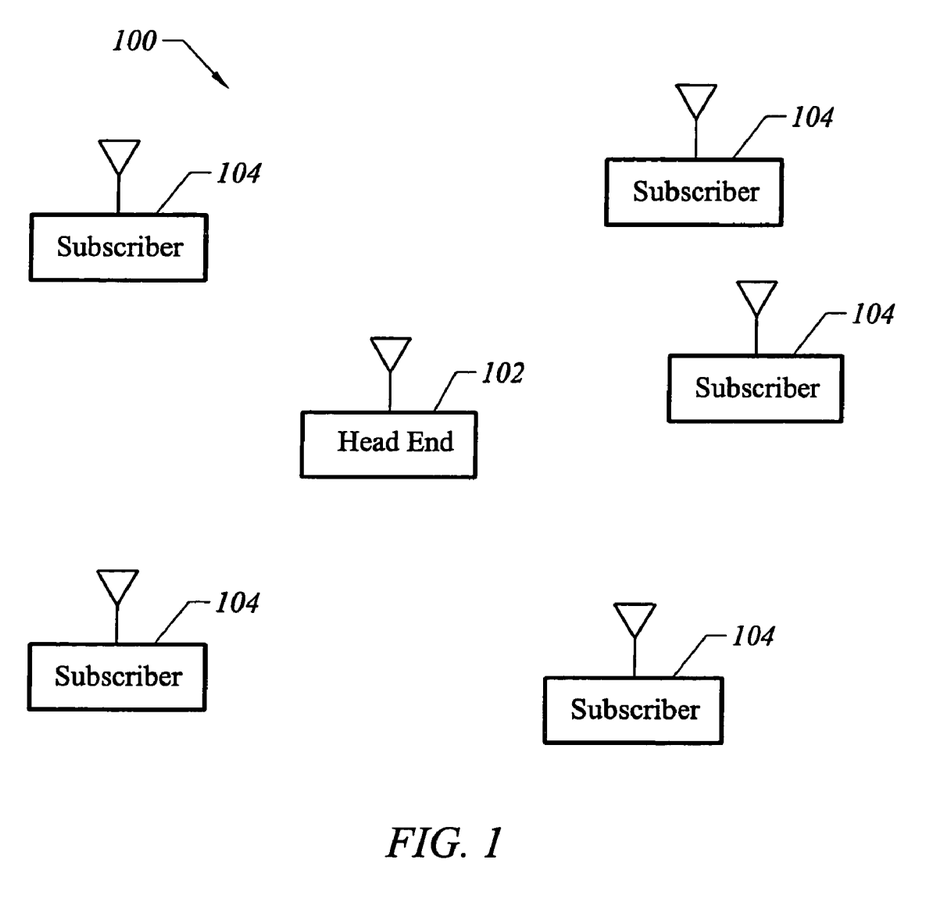
FIG. 1 depicts a point to multipoint wireless communication system according to one embodiment of the present invention.

FIG. 1 depicts a point to multipoint wireless communication network 100 suitable for implementing one embodiment of the present invention. Network 100 includes a central access point or head end 102 and multiple subscriber units 104. All communication is typically either to or from central access point 102. Communication from central access point 102 to one or more subscriber units 104 is herein referred to as downstream communication. Communication from any one of subscriber units 104 to central access point 102 is herein referred to as upstream communication. In one embodiment, different frequencies are allocated to upstream and downstream communication. In alternate embodiments, subscriber units 104 may communicate with one another directly.

Each of one or more upstream frequencies is common to multiple subscriber units. To prevent collisions between subscriber units when accessing the shared medium, a medium access control (MAC) protocol is provided. According to one embodiment of the present invention, a MAC protocol intended for data transmission over cable systems may be used to coordinate upstream communications in wireless network 100. An exemplary MAC protocol of this type is the so-called MCNS protocol described in the Data-over-Cable Service Interface Specifications, Radio Frequency Interface Specification, SP-RFI-I04-980724, (Cable Television Laboratories, 1997).

MCNS employs a time domain multiple access (TDMA) scheme to allocate access to the shared upstream frequency among multiple subscriber units 104. The entities controlling operation according to the MAC protocol at central access point 102 and subscriber units 104 are referred to collectively as the MAC layer. This identifies these entities as collectively representing a layer in a multi-layer communication model. In reference to the well-known OSI multi-layer model of data communications, the MAC layer as it is discussed here corresponds to a lowest sublayer of the data link layer. Underneath the MAC layer is the physical layer which is responsible for transmitting and receiving bits over the wireless channel. The MAC layer implements a TDMA scheme for upstream communication. Each of one or more frequencies is divided into a series of frames or minislots in the time domain.

Figure 2:
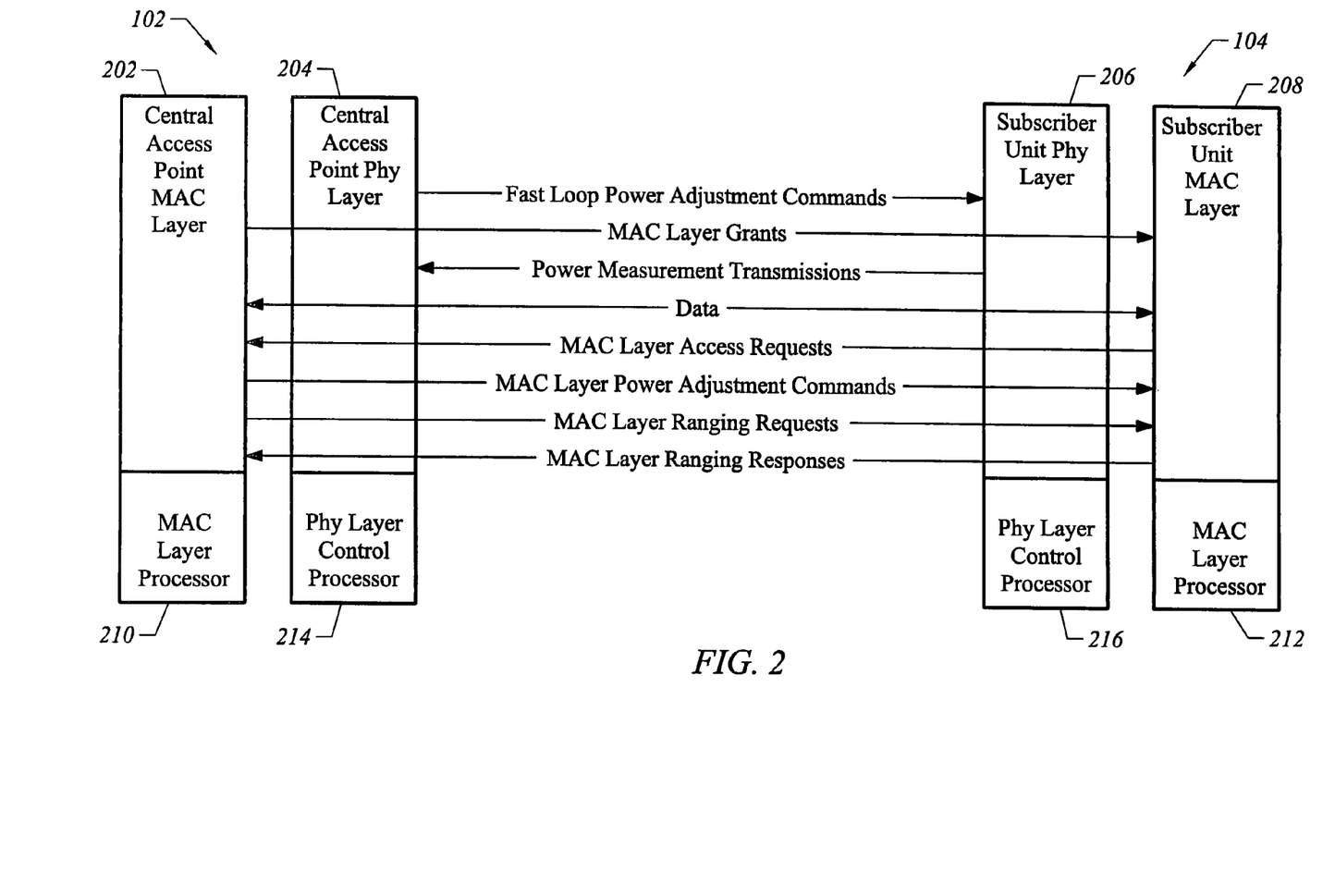
FIG. 2 depicts interaction between a central access point and a representative subscriber unit of a point to multipoint communication system according to one embodiment of the present invention.

FIG. 2 depicts interactions between central access point 102 and one of subscriber units 104. Central access point 102 includes a central access point MAC layer block 202 and a central access point physical layer block 204. Subscriber unit 104 includes a subscriber unit physical layer block 206 and a subscriber unit MAC layer block 208.

In one embodiment, central access point MAC layer block 202 and subscriber unit MAC layer block 208 collectively operate according to the MCNS protocol. In MCNS applications, central access point MAC layer block 202 may be a BCM3210B integrated circuit available from Broadcom, Inc. of Irvine, Calif. Subscriber unit MAC layer processor 212 may be a BCM3300 integrated circuit provided by Broadcom.

Data and MAC layer network management information that are passed between MAC layer blocks 202 and 208 pass through physical layer blocks 204 and 206 which are directly responsible for exchange of bits across the wireless channel. Central access point 102 has exclusive access to at least one frequency for downstream transmissions. Subscriber unit 104, however, shares access to one or more upstream transmission frequencies in accordance with the operative MAC protocol.

One class of network management messages exchanged between central access point MAC layer block 202 and subscriber unit MAC layer block 208 implements ranging, the process of establishing the round trip propagation delay between central access point 102 and subscriber unit 104. Ranging requests including time stamps showing the current clock value at central access point 102 are sent downstream periodically to subscriber unit 104. Ranging responses sent from subscriber unit 104 to central access point 102 assist central access point 102 in determining the round trip propagation delay between central access point 102 and subscriber unit 104. Ranging responses occur at times reserved by central access point MAC layer block 202 for upstream ranging transmission from subscriber unit 104.

In MCNS, central access point 102 measures the power level of the MAC layer ranging response messages received from subscriber unit 104. Although the power adjustment process that occurs concurrently with ranging is controlled by central access point MAC layer block 202, the power measurement may be made by central access point physical layer block 204. In response to each such power measurement made on a ranging response message, central access point MAC layer block 202 formulates power adjustment information to transmit to subscriber unit 104. The power adjustment information transmitted downstream may be, e.g., the raw power measurement, or a desired transmitted power level or adjustment. Subscriber unit 104 adjusts its power output in response to the power adjustment information. Techniques for adjusting power are described in the co-filed, co-assigned application entitled MULTI-LOOP POWER CONTROL. The repetition of these power measurements and power adjustments implements an automatic level control (ALC) loop that regulates the output power of subscriber unit 104. Subscriber unit MAC layer block 208 receives the power adjustment information and directs subscriber unit physical layer block 206 to modify transmitter power in response.

Central access point MAC layer block 202 and subscriber unit MAC layer block 208 also act as data interfaces to higher layers. Application data including, e.g., voice, video, computer files, etc. is exchanged between central access point MAC layer block 202 and subscriber unit MAC layer block 208.

Downstream transmissions from central access point MAC layer block 202 to subscriber unit MAC layer block 208 include a MAC layer address of subscriber unit 104 to identify the intended recipient. Upstream transmissions from subscriber unit MAC layer block 208 to central access point MAC layer block 202 may be identified by a source address or by their position and time.

When subscriber unit MAC layer block 208 has application data ready for upstream transmission to central access point MAC layer block 202, it transmits a special network management message known as an access request (RA). MCNS allocates certain time domain slots for transmission of access requests. Since an access request does not contain very much information, the slot reserved for the access request may be very short. Access request slots are not allocated to particular subscriber units. Instead, there is a possibility that multiple subscriber units will simultaneously issue access requests within the same time slot causing what is known as a collision.

A MAC protocol such as MCNS provides mechanisms for handling such collisions where each subscriber unit upon detecting an occurrence of a collision delays retransmission by an independently calculated pseudo random time interval. In orthogonal frequency division multiplexing (OFDM) systems, multiple subscriber units may transmit access request in the same time slot by employing different frequency subchannels of the common upstream frequency allocation. Such a scheme is disclosed in the patent application, U.S. application Ser. No. 09/019,938 and in the co-filed patent application entitled EFFICIENT REQUEST ACCESS FOR OFDM SYSTEMS.

In response to an access request, central access point MAC layer block 202 sends a grant downstream to subscriber unit MAC layer block 208. The grant notifies subscriber unit MAC layer block 208 of the upstream time slot or slots reserved for transmission by subscriber unit 104.

According to the present invention, ALC of subscriber unit transmission power may be enhanced using a power adjustment sequence that occurs in response to MAC layer access requests. Power adjustment commands may be based on power measurements made on either the access requests themselves, special upstream power measurements that are scheduled in response to access requests, or some combination of the two. Power adjustment commands generated in this way help implement an ALC loop that has a faster response time than the ALC loop that is based on power measurements of ranging responses. Such fast loop power adjustment commands more accurately reflect current channel conditions at the time of an upstream data transmission. They provide much greater tolerance to fading channels than would be provided by reliance on the MAC layer power adjustment commands based on measurements of the ranging responses. Central access point physical layer block 204 and subscriber unit physical layer block 206 include systems for encoding, decoding, demodulating and modulating to implement radio communication between central access point 102 and subscriber unit 104. Subscriber unit physical layer block 206 is also capable of controlling its transmitter output power level.

A central access point physical layer control processor 214 is responsible for formulating power adjustment commands in response to power measurements made on power measurement transmissions, data, and access requests. A subscriber unit physical layer processor 216 is responsible for formulating power measurement transmissions and for adjusting power in response to power adjustment commands and instructions received from subscriber unit MAC layer block 208 and physical layer control processor 214.

Figure 3:
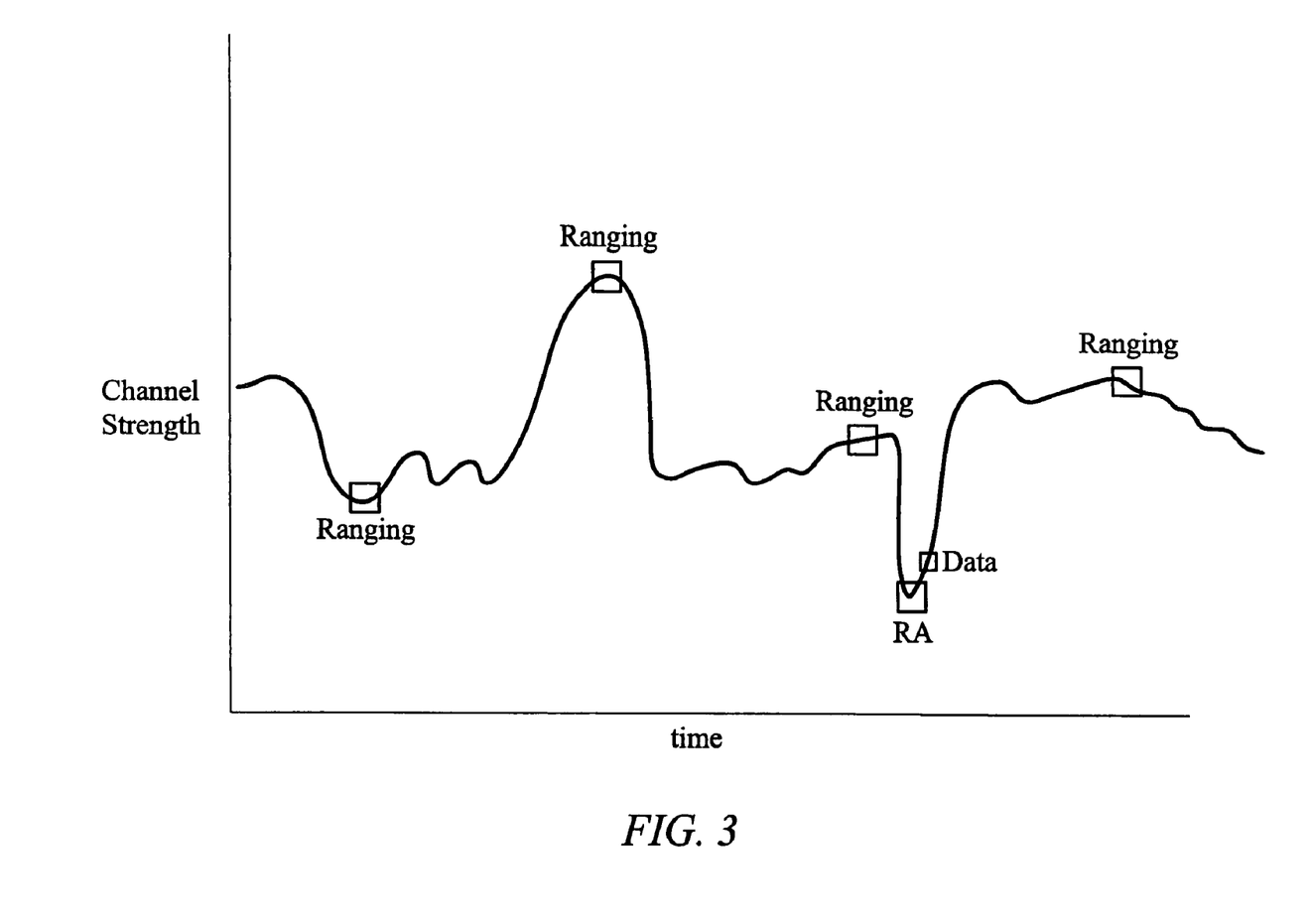
FIG. 3 depicts a sequence of power measurements in the time domain according to one embodiment of the present invention.

FIG. 3 depicts the location of upstream power measurements and time for a particular subscriber unit. The horizontal axis corresponds to time. The vertical axis corresponds to a magnitude of channel response. Each square marked "Ranging" indicates a power measurement made on an upstream ranging response. A square marked "RA" denotes a power measurement made on an upstream access request. A square marked "Data" indicates a time when central access point 102 receives a data transmission from subscriber unit 104.

Subscriber unit 104 may regulate the transmission power of the access request based on previous MAC layer power adjustment commands received from central access point 102. These commands were in turn generated based on measurements of previous upstream ranging responses. The power of the upstream data transmission is, however, set based on a power adjustment command which was generated based on a measurement of the access request power. It can be seen that the access request is much closer in time to the data transmission than the most recent ranging response. Therefore, the data transmission power will more closely reflect current channel conditions than it would if it were based on a MAC layer power adjustment command.

Figure 4:
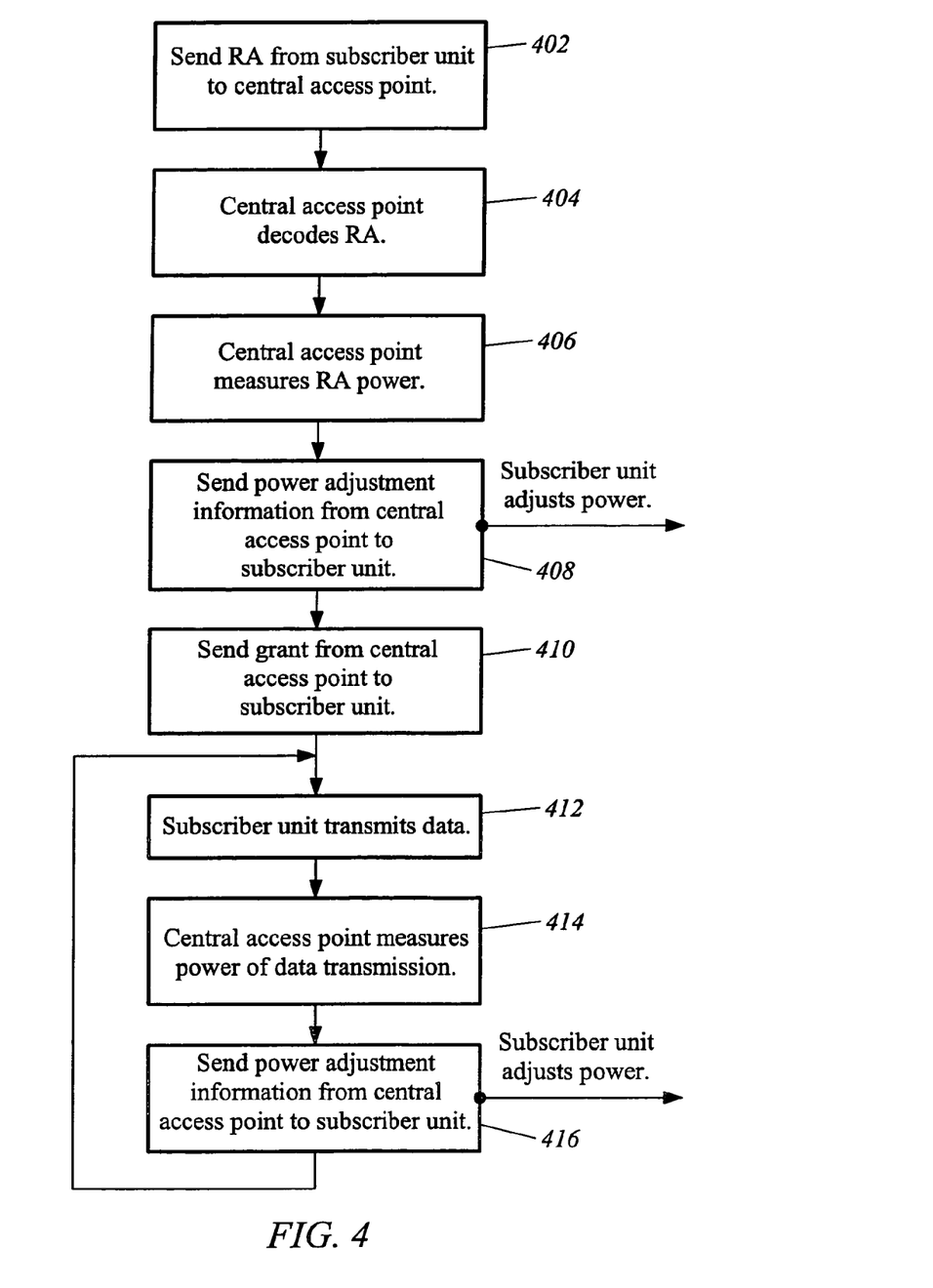
FIG. 4 is a flowchart describing steps of controlling subscriber unit output power according to one embodiment of the present invention.

FIG. 4 is a flowchart describing steps of controlling subscriber unit output power according to one embodiment of the present invention. At step 402, subscriber unit 104 sends an access request to central access point 102. At step 404, central access point 102 decodes the access request. If there is a collision, or if excessive noise and/or interference corrupts the access request, the access request may not be successfully decoded. In the system described here, the likelihood of an access request not being successfully decoded is higher than this likelihood for a data transmission. This is because the power level for the access request will be based on a previous ranging response power measurement or will be uncontrolled. If channel conditions have deteriorated significantly since the last ranging response or if the noise level is too high for successful transmission of the uncontrolled power level, the access request will not be successfully transmitted. If this occurs, the access request may be repeated. It should be noted that additional redundancy may be employed in transmitting access request data because the amount of access request data is relatively small. This will make the access request robust to impaired channel conditions and reduce the need for repeat transmissions.

At step 406, central access point 102 measures the power in the access request. This power measurement is performed within central access point physical layer block 204. Physical layer control processor 214 formulates power adjustment information for subscriber unit 104 to help bring its power to the desired level. At step 608, physical layer control processor 214 sends the power adjustment information to subscriber unit 104. The command is received by subscriber unit 104 and physical layer control processor 216 responds by performing power adjustment computations and adjusting the subscriber unit transmitter power level. Details of power adjustment computations are disclosed in the patent application entitled POWER REGULATION USING MULTI-LOOP CONTROL. Details of communicating physical layer control information downstream are disclosed in the patent application entitled COMMUNICATION OF PHYSICAL LAYER CONTROL PARAMETERS.

At step 410, central access point 102 sends a MAC layer grant to subscriber unit 104 scheduling a time for the subscriber unit's data transmission. The grant may schedule multiple slots for the transmission of data or just one. At step 412, subscriber unit 104 transmits data to central access point 102 during the first assigned slot. The data transmission occurs at the newly adjusted power level. At step 414, central access point 102 measures the power of this data transmission and formulates new power adjustment information. The new power adjustment information is intended to control the output power used for subsequent data transmissions scheduled in the grant of step 410. At step 416, central access point 102 sends the further power adjustment information to subscriber unit 104. A new desired power adjustment is computed by subscriber unit 104 based on this power adjustment information.

Steps 412, 414, and 416 may repeat for as many data transmission slots are reserved by the grant of step 410. Steps 414 and 416 need not be performed for the last data slot transmitted upstream and they need not be performed at all if the grant of step 410 only reserves one data slot for transmission.

In an alternative embodiment, subscriber unit 104 sends a special power measurement transmission to central access point 102 after transmitting an access request but before transmitting data. Adjustment of the subscriber units output power level for the data transmission depends in part then on a power measurement made by central access point 102 on the special power measurement transmission. The power measurement transmission will be closer in time to the data transmission than the access request. Therefore, the output power level for the data transmission is set even more accurately than if the power adjustment information transmitted to subscriber unit 104 is based on the access request transmission.

The power measurement transmission may be in a very short time slot reserved for use by the subscriber unit. Alternatively, in an ODFM system, multiple subscriber units may transmit within the same power measurement slot by using independent frequency domain subchannels. Such a power measurement transmission scheme is disclosed in the patent application entitled REALTIME POWER CONTROL IN OFDM SYSTEMS.

Figure 5:
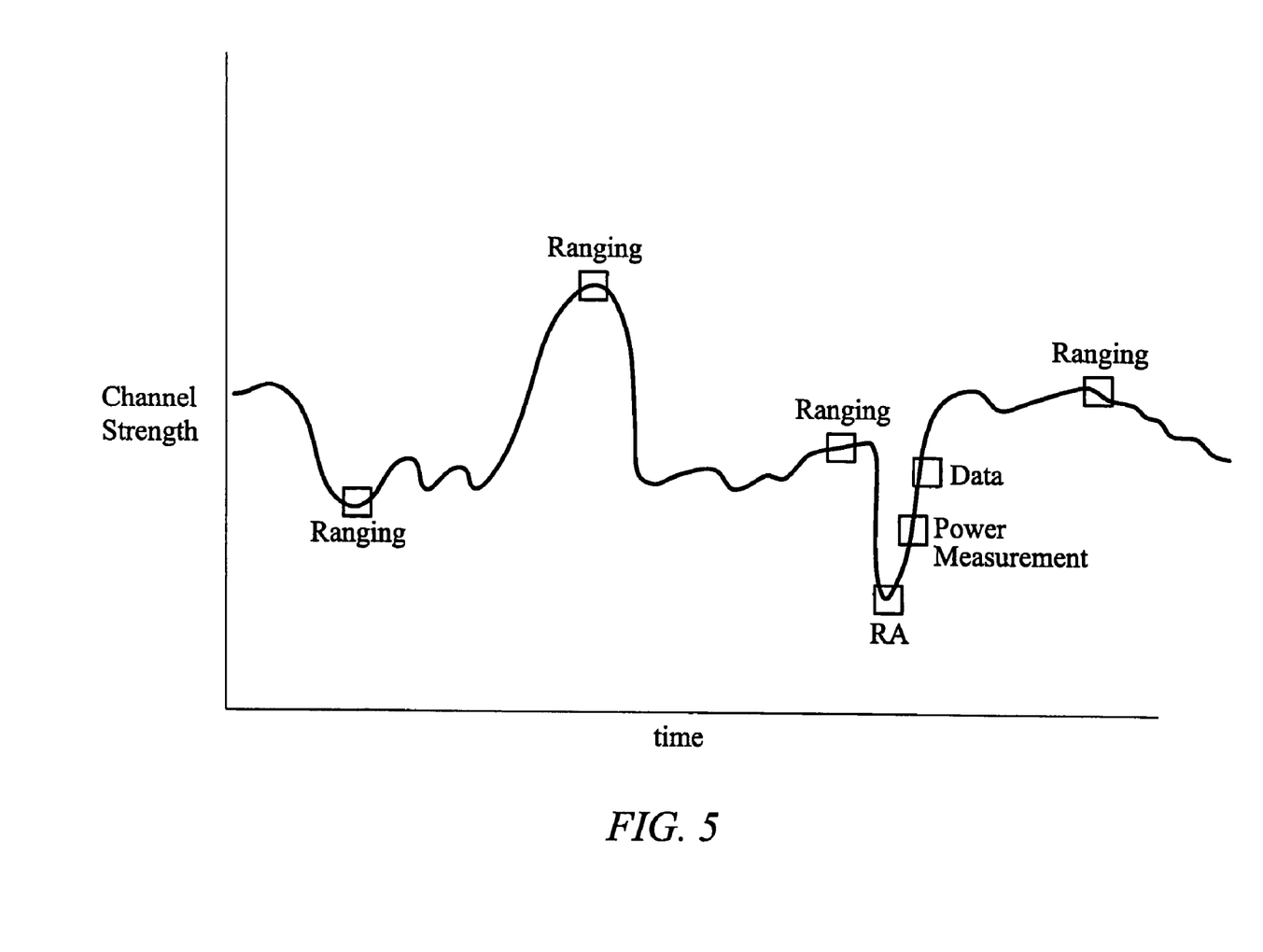
FIG. 5 depicts a sequence of power measurements in the time domain in an alternative embodiment of the present invention.

FIG. 5 illustrates the position of power measurements in the time domain in this alternative embodiment. As in FIG. 3, the horizontal axis represents time while the vertical axis represents a magnitude of channel response. Labeled squares indicate the times of upstream ranging responses, an access request, and a data transmission. Additionally, there is a power measurement transmission between the access request and the data transmission.

Figure 6:
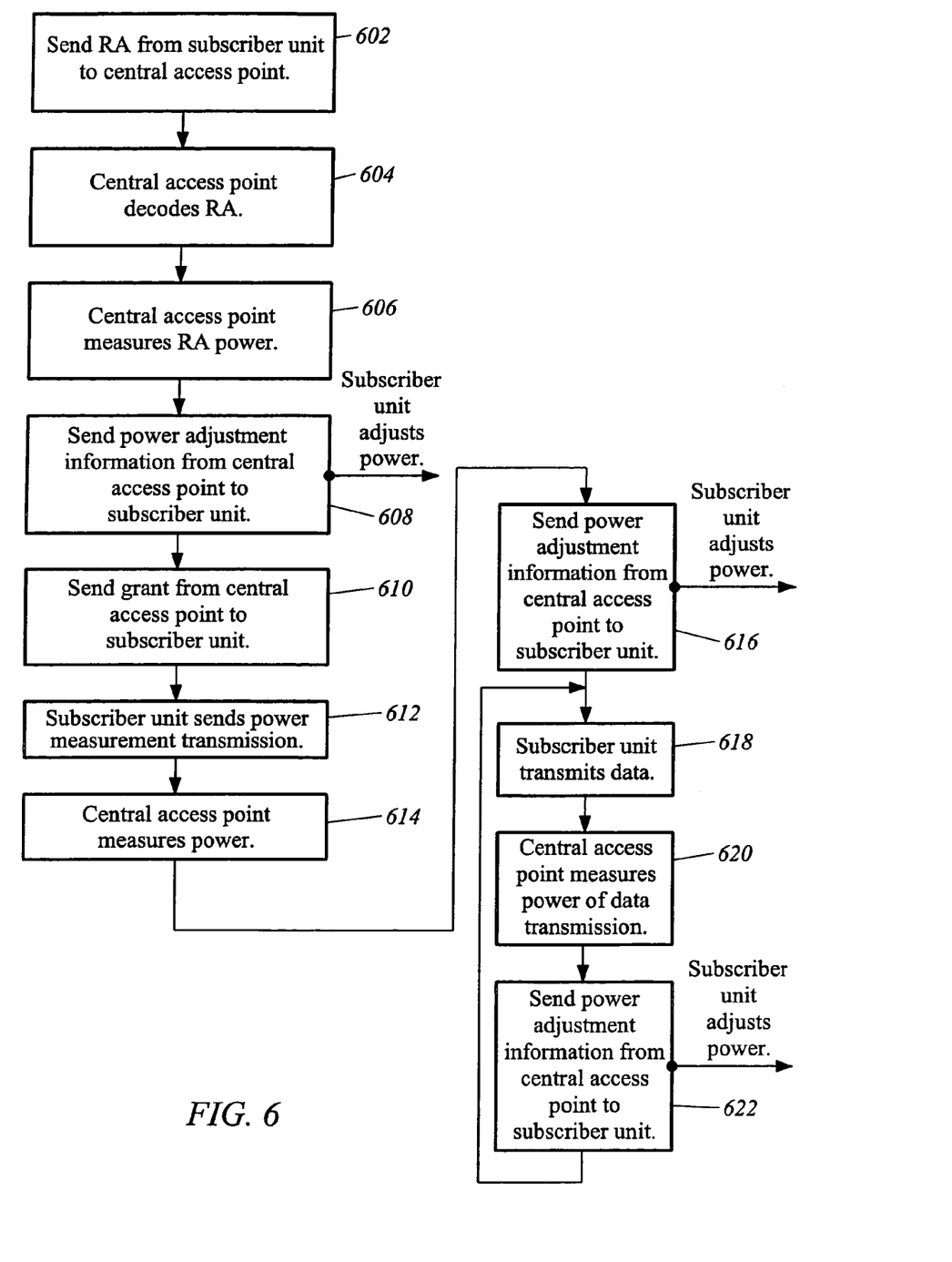
FIG. 6 is a flowchart describing steps of controlling subscriber unit output power according to an alternative embodiment of the present invention.

FIG. 6 is a flow chart describing steps of regulating subscriber unit output power in this alternative embodiment. Steps 602 through 608 are essentially the same as steps 402 through 408. At step 610, central access point 102 sends a MAC layer grant to subscriber unit 104. The grant includes not only information identifying reserved time slots for one or more data transmissions but also information identifying time slots for one or more special power measurement transmissions. At step 612, subscriber unit 104 sends a power measurement transmission to central access point 102. At step 614, central access point 102 measures the power of this power measurement transmission. At step 616, central access point 102 formulates and sends power adjustment information to subscriber unit 104. Subscriber unit responds by adjusting power accordingly.

At step 618, subscriber unit 104 transmits data at the adjusted power level. At steps 620 central access point 102 measures power of the data transmission. A new power adjustment is then estimated based on the measured power of the data transmission. Alternatively, there may be further special power measurements preceding the next data transmission. The power adjustment would then be based on either one or more power measurement transmissions or the combination of the measured power level of the data transmission and the measured power level of the one or more power measurement transmissions. At step 622, central access point 102 sends power adjustment information to subscriber unit 104 and subscriber unit 104 responds by adjusting its power for the next data transmission.

Step 618, 620 and 622 may repeat for as many data slots as are reserved by the grant of step 610. Preferably, power measurement transmissions are also reserved within the grant of the step 610. Steps 620 and 622 need not be repeated after the last data transmission and need not be performed at all if there is only one data slot reserved in the grant of step 610.

Figure 7A:
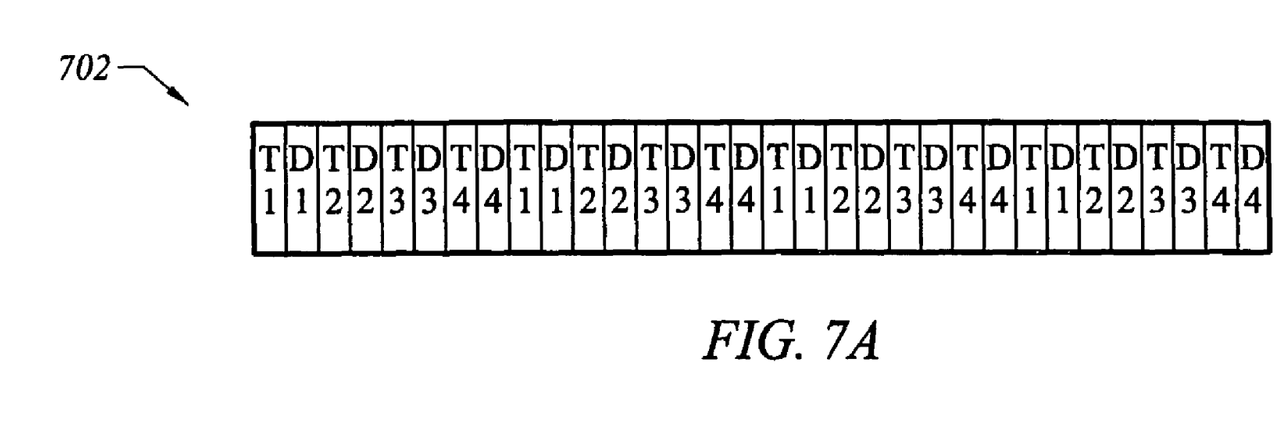
FIGS. 7A–7B depict alternative structures of an access request OFDM burst according to one embodiment of the present invention.
Figure 7B:
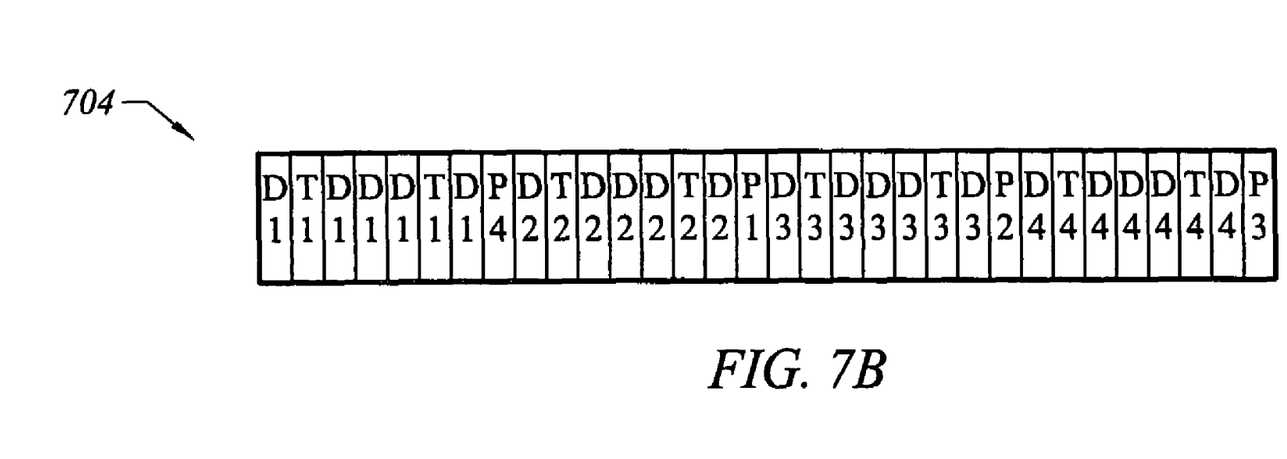

FIGS. 7A–7B depict alternative structures for an access request transmission in an OFDM system where available spectrum is divided into orthogonal frequency domain subchannels. FIG. 7A depicts a frequency domain structure 702 of an access request transmission. The access request is a single burst in an OFDM communication system occupying one time domain slot allocated by the MAC layer. The structure of the access request burst is along the lines described in U.S. application Ser. No. 09/019,938. In FIGS. 7A–7B, four different subscriber units share the access request burst. Each of the four subscriber units employs a different nonoverlapping subgroup of tones so that all four subscriber units may request access simultaneously without causing a collision. In one embodiment, each subscriber unit randomly selects which subgroup to use for each new access request. Alternatively, upon initial registration to central access point 102, each of subscriber units 104 is assigned one of the four tone subgroups for use in requesting access.

FIG. 7A depicts representative frequency domain structure 702 of an access request transmission implemented as a burst of 32 symbols. The horizontal axis of FIG. 7A represents frequency and each labeled rectangle represents one of the 32 symbols of the burst. Each subscriber unit transmits both training symbols and data symbols. Each subscriber unit's symbols are distributed over the spectrum. In this configuration, each subscriber unit should transmit a sufficient number of training symbols having predetermined values for central access point 102 to characterize both the magnitude and phase of the channel response between central access point 102 and the particular subscriber unit over the entire channel. This channel response characterization is not for power control purposes but rather to support receiver signal processing to assure that access request information is received correctly. The number of training symbols for each subscriber unit should be at least ν where ν is the maximum expected duration of the channel impulse response from any subscriber unit to central access point 102. The technique for determining the channel response based on ν training symbols is disclosed in U.S. patent application Ser. No. 09/234,929, the contents of which are herein incorporated by reference.

In the representative embodiment shown in FIG. 7A, each subscriber unit is allocated eight symbols of the burst, four for data and four for training. Symbols reserved for training are denoted by "Tx" where x identifies a particular one of the four subscriber units sharing the burst (1, 2 3, or 4). "Dx" denotes symbols reserved for data. Central access point 102 measures the power level for each subscriber unit separately using the received levels of the training symbols. Central access point 102 recovers each data symbol by dividing the received data symbol value by the channel response value for the data symbol's position in the band.

FIG. 7B depicts an alternative frequency domain structure 704 for an access request burst. The access request burst of FIG. 7B also includes 32 symbols. In frequency domain structure, 704, however, each subscriber unit's data and training symbols are contiguous within a reserved sub-band. Instead of using the channel estimation technique disclosed in U.S. application Ser. No. 09/234,929, central access point 102 instead divides the received value of each training symbol by the known transmitted value to obtain the channel response magnitude and phase for each training symbol position. Channel response values for the remaining symbols are determined by interpolation. Since each subscriber unit transmits primarily in a limited sub-band, for channel training purposes it suffices that each subscriber unit transmits a sufficient number of training symbols to characterize the channel response within its own sub-band only. In the representative embodiment of FIG. 7B, only two training symbols are required for each subscriber unit. Details of the channel estimation technique to be employed with the access request burst of FIG. 7B are described in the patent application entitled EFFICIENT REQUEST ACCESS FOR OFDM SYSTEMS.

However, to optimally control subscriber unit output power, it is preferable that power measurement for each subscriber unit be based on symbols spread throughout the band. Accordingly, in addition to transmitting data and training symbols within a reserved sub-band, each subscriber unit also transmits supplemental power measurement symbols outside its own sub-band. The power measurement symbols are not used for training and do not carry access request data. To determine the received power level for a particular subscriber unit, central access point 102 uses the magnitudes of the training symbols and power measurement symbols. The data symbols may be used for measuring power if they have constant magnitude as in e.g., a QPSK scheme. It should be noted that the magnitude values used for power measurement are preferably not processed to correct for the measured channel response.

In FIG. 7B, symbols reserved for data and training are marked as in FIG. 7A while the supplemental power measurement symbols are marked as "Px" where x identifies the subscriber unit. Because of the reduced training overhead, each subscriber unit may now include 5 data symbols in its access request rather than 4 as in FIG. 7A, permitting transmission of more information relating to the access request. According to the present invention, one may also employ the lower training overhead to allow more subscriber units to share the access request burst.

It will be understood that the examples and embodiments described herein are for illustrative purposes only and various modifications and changes in like thereof will be suggested to persons skilled in the art and are to included within the spirit and purview of this application and the scope of the appended claims. For example, the present invention may be applied to wireline systems. All publications, patents, and patent applications cited herein are hereby incorporated by reference.

The invention claimed is:

1. In a point to multipoint communication system, apparatus for operating a central access point, said apparatus comprising:
   means for receiving an access request transmission from a subscriber unit;
   means for performing a power control sequence to control output power of said subscriber unit in response to said access request transmission, said power control sequence performing means comprises:
   means for measuring power of said access request transmission;
   means for formulating power adjustment information based on measured power of said access request transmission; and
   means for, in response to measured power of said access request transmission, sending said power adjustment information to said subscriber unit to control power of a future transmission from said subscriber unit; and
   wherein said access request transmission is included within an OFDM burst that includes access request information from said subscriber unit and another subscriber unit.

2. The apparatus of claim 1 further comprising:
   means for, in response to said access request transmission, sending a grant message scheduling a time slot for said future transmission.

3. The apparatus of claim 2 wherein said future transmission comprises a data transmission.

4. The apparatus of claim 2 wherein said future transmission comprises a power measurement transmission that is part of said power control sequence and said grant message further schedules a time slot of a data transmission, said power control sequence performing means further comprising:
   means for measuring power of said power measurement transmission; and
   means for, in response to measured power of said access request transmission, sending a further power adjustment information to said subscriber unit to control power of a next transmission from said subscriber unit.

5. The apparatus of claim 4 wherein said future transmission is said data transmission.

6. The apparatus of claim 1 further comprising:
means for receiving network management transmissions from said subscriber unit at substantially fixed intervals;
means for measuring power of said network management transmissions as said network management transmissions are received; and
means for, in response to measured power of said network management transmissions, sending power adjustment information to said subscriber unit at intervals substantially similar to said fixed intervals.

7. The apparatus of claim 1 wherein said access request information from said subscriber unit is included only within a contiguous subband of said OFDM burst.

8. The apparatus of claim 7 further comprising:
means for measuring power of said subscriber unit by measuring power of at least one symbol inside said contiguous subband and at least one symbol outside said contiguous subband.

9. In a point to multipoint communication system, apparatus for operating a subscriber unit comprising:
means for sending an access request transmission to a central access point;
means for receiving a first power adjustment information indicator from said central access point, said first power adjustment information indicator having been generated based on measured power of said access request transmission;
means for receiving a scheduling transmission from said central access point, said scheduling transmission having been generated in response to said access request transmission, said scheduling transmission specifying a time slot of a future transmission by said subscriber unit; and
means for sending said future transmission to said central access point at a power level determined responsive to said first power adjustment information indicator; and
wherein said access request transmission is included within an OFDM burst that includes access request information from said subscriber unit and another subscriber unit.

10. The apparatus of claim 9 wherein said future transmission comprises a data transmission.

11. The apparatus of claim 9 wherein said future transmission comprises a power measurement transmission.

12. The apparatus of claim 11 wherein said scheduling transmission further specifies time of a data transmission.

13. The apparatus of claim 12 further comprising
means for receiving a second power adjustment information indicator from said central access point, said second power adjustment information indicator having been generated in response to said power measurement transmission; and
means for sending said data transmission to said central access point at a power level determined responsive to said second power adjustment information indicator.

14. The apparatus of claim 9 further comprising:
means for sending network management transmissions to said central access point at substantially fixed intervals;
means for receiving power adjustment information indicators based on said network management transmissions; from said central access point, said power adjustment information indicators being generated in response to power measurements made on said network management transmissions; and
means for adjusting power levels of said network management transmissions in response to said adjustment information indicators.

15. In a point to multipoint communication system, a product for operating a central access point, said product comprising:
instructions that cause receipt of an access request transmission from a subscriber unit;
instructions that cause performance of a power control sequence to control output power of said subscriber unit in response to said access request transmission, wherein said power control sequence comprises:
measuring power of said access request transmission;
formulating power adjustment information based on measured power of said access request transmission; and
in response to measured power of said access request transmission, sending said power adjustment information to said subscriber unit to control power of a future transmission from said subscriber unit;
a medium that stores the instructions; and
wherein said access request transmission is included within an OFDM burst that includes access request information from said subscriber unit and another subscriber unit.

16. In a point to multipoint communication system, a product for operating a subscriber unit, said product comprising:
instructions that cause sending of an access request transmission to a central access point;
instructions that cause receiving of a first power adjustment information indicator from said central access point, said first power adjustment information indicator having been generated based on measured power of said access request transmission;
instructions that cause receiving of a scheduling transmission from said central access point, said scheduling transmission having been generated in response to said access request transmission, said scheduling transmission specifying a time slot of a future transmission by said subscriber unit;
instructions that cause sending of said future transmission to said central access point at a power level determined responsive to said first power adjustment information indicator; and
a medium that stores the instructions; and
wherein said access request transmission is included within an OFDM burst that includes access request information from said subscriber unit and another subscriber unit.

17. A method for operating a node in a communication system, said method comprising:
receiving OFDM signals from a subscriber unit;
from said OFDM signals, extracting an access request transmission and a data transmission, wherein said access request transmission is included within an OFDM burst;
based on received power levels of said access request transmission and said data transmission, formulating power adjustment information; and
transmitting said power adjustment information to said subscriber unit;
wherein said OFDM burst includes access request information from said subscriber unit and another subscriber unit.

18. The method of claim 17 further comprising:
extracting a power measurement transmission from said OFDM signals; and
wherein said power adjustment information is formulated further based on received power levels of said power measurement transmission.

19. Apparatus for operating a node in a communication system, said apparatus comprising:
a physical layer block that receives OFDM signals from a subscriber unit and extracts an access request transmission and a data transmission from said OFDM signals, wherein said access request transmission is included within an OFDM burst; and
a physical layer control processor that, based on received power levels of said access request transmission and said data transmission, formulates power adjustment information; and
said physical layer block being used to transmit said power adjustment information to said subscriber unit;
wherein said OFDM burst includes access request information from said subscriber unit and another subscriber unit.

20. The apparatus of claim 19 wherein said physical layer block further extracts a power measurement transmission from said OFDM signals and said power adjustment information is formulated based on said power measurement transmission.

21. Apparatus for operating a node in a communication system, said apparatus comprising:
means for receiving OFDM signals from a subscriber unit;
means for, from said OFDM signals, extracting an access request transmission and a data transmission, wherein said access request transmission is included within an OFDM burst;
means for, based on received power levels of said access request transmission and said data transmission, formulating power adjustment information; and
means for transmitting said power adjustment information to said subscriber unit;
wherein said OFDM burst includes access request information from said subscriber unit and another subscriber unit.

* * * * *